No. 699,217. Patented May 6, 1902.
H. McCORNACK.
CENTRIFUGAL MACHINE.
(Application filed July 26, 1900.)

(No Model.)

United States Patent Office.

HERBERT McCORNACK, OF WESTCHESTER, PENNSYLVANIA.

CENTRIFUGAL MACHINE.

SPECIFICATION forming part of Letters Patent No. 699,217, dated May 6, 1902.

Application filed July 26, 1900. Serial No. 24,860. (No model.)

*To all whom it may concern:*

Be it known that I, HERBERT McCORNACK, a citizen of the United States of America, and a resident of Westchester, in the county of Chester and State of Pennsylvania, have invented certain new and useful Improvements in Centrifugal Machines, of which the following is a specification.

My improvements relate particularly to centrifugal liquid-separators and are fully described in connection with the accompanying drawings.

Figure 1:
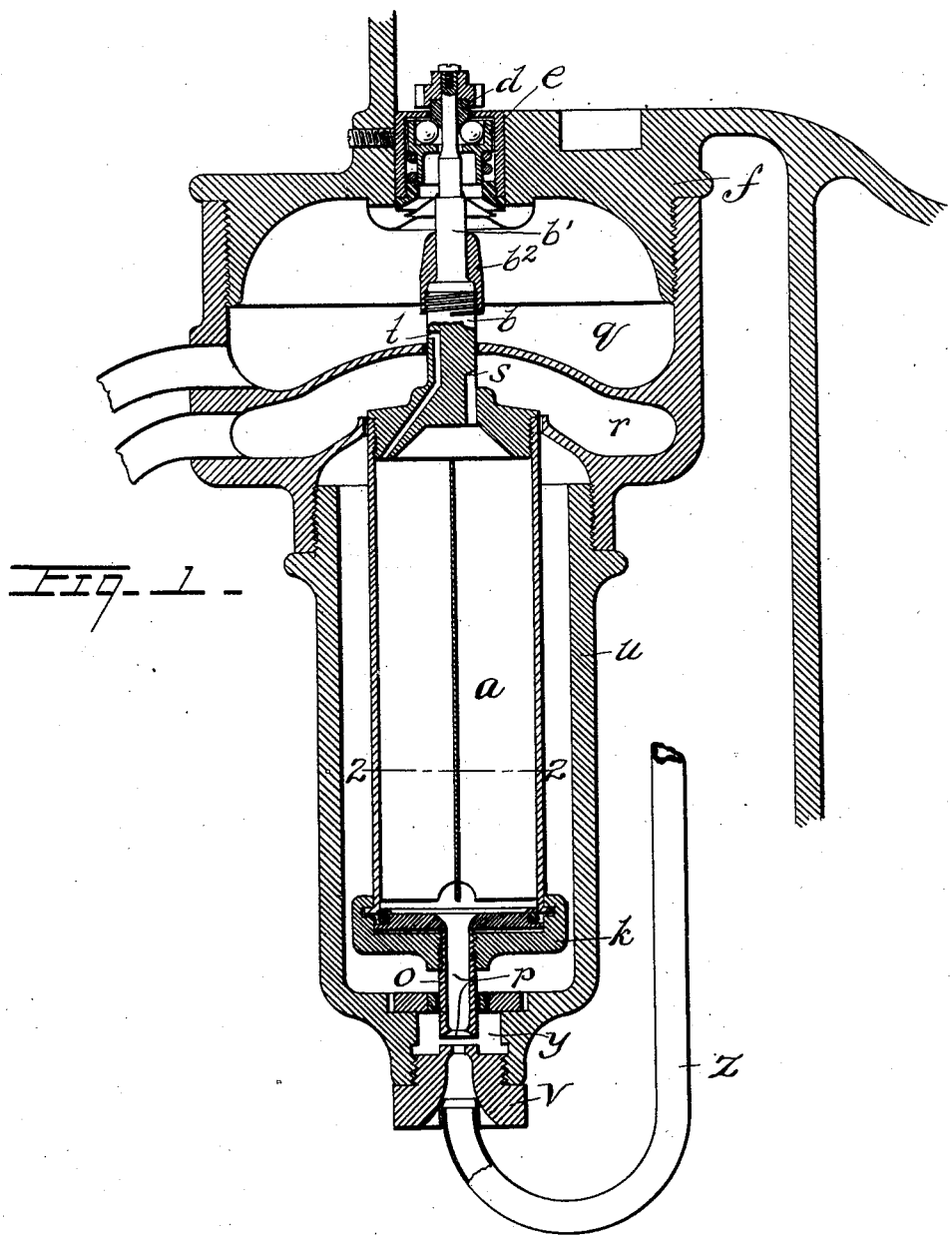
Figure 2:
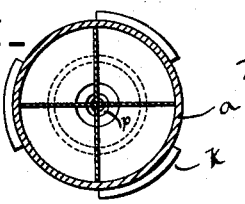

Figure 1 is a sectional elevation of a machine embodying my improvements. Fig. 2 is a cross-section of the centrifugal vessel, taken on the line 2 2 of Fig. 1.

The rotary separator vessel $a$ is of tubular form, as shown, and is carried entirely by means of a top spindle which is so formed and mounted above the vessel as to allow the suspended rotary vessel to swing out of the normal axis of rotation whenever such a movement is developed by the operation of the vessel while normally tending to return to said axis. This spindle construction, however, forms no part of my present invention, being substantially included in a later application filed by me July 26, 1901, Serial No. 69,817, and need not be particularly described. The lower end of the vessel is closed, as shown, by a cap $k$, secured in any suitable manner, and is provided with a hollow neck $o$, which forms an axial inlet to the vessel.

The receiving-pans $q$ and $r$ for the lighter and heavier liquids discharged at the top of the vessel through the respective outlets $s$ and $t$ are carried, as shown, by the overhanging portion $f$ of the frame, and a suitable casing $u$ is provided for the rotary vessel. The compound liquid to be separated is admitted through the axial opening $p$ at the bottom of the vessel, as hereinafter described, and the heavier and lighter constituents are continuously discharged, as usual, through said outlets $s$ and $t$.

At the bottom of the casing $u$ and directly under the inlet-neck $o$ is a fixed nozzle $v$, the reduced outlet of which is located in the normal axis of rotation of the vessel and slightly below the flared inlet $p$ to the neck $o$ and surrounding which is a receiving-chamber or drip-cup $y$, formed in the lower portion of the casing. A supply-pipe $q$, connected with any suitable reservoir, conveys the liquid to be operated on to the nozzle $v$ under a sufficient pressure to discharge from the latter and through the inlet-neck $a$ into the vessel a vertical column of the liquid. Any portion of the latter which may fail to properly enter or to be retained in the rotary vessel will be caught in the drip cup or chamber $y$ and brought under the action of the inflowing jet, so as to be drawn in therewith through the flared opening $p$.

The effect of my improved manner of suspending the centrifugal vessel and of feeding the liquid thereto is to provide a machine of simple construction the satisfactory operation of which can be especially relied on.

What I claim is—

1. In a centrifugal machine, a suspended centrifugal liquid-separator vessel having an axial feed-inlet at its lower end, and a fixed supply-nozzle below said inlet arranged in alinement with the normal axis of rotation of the vessel.

2. In a centrifugal machine, a suspended centrifugal liquid-separator vessel having an axial feed-inlet at its lower end, a fixed supply-nozzle below said inlet arranged in alinement with the normal axis of rotation of the vessel, and a drip-cup located between said inlet and nozzle, substantially as set forth.

3. In a centrifugal machine, a suspended centrifugal liquid-separator vessel having an axial feed-inlet at its lower end, provided with a flaring mouth, and a fixed supply-nozzle below said inlet arranged in alinement with the normal axis of rotation of the vessel.

Signed by me at Westchester, Pennsylvania, this 14th day of July, 1900.

HERBERT McCORNACK.

Witnesses:
FRANK B. RUPERT,
MARY E. RUPERT.